United States Patent [19]
Quenot

[11] 3,863,860
[45] Feb. 4, 1975

[54] CASE FOR A LINEAR MEASURING DEVICE

[75] Inventor: Michel Quenot, Besancon, France

[73] Assignees: Stanley Mabo, Trepillot; Besancon, France

[22] Filed: Jan. 19, 1973

[21] Appl. No.: 325,030

[52] U.S. Cl. ................... 242/84.8, 242/96, 242/99
[51] Int. Cl. ...................... B65h 75/16, B65h 75/40
[58] Field of Search ............ 242/84.8, 107 R, 107.2, 242/107.3, 96, 99; 33/138

[56] References Cited
UNITED STATES PATENTS

| | | | |
|---|---|---|---|
| 2,312,943 | 3/1943 | Buskirk | 242/84.8 |
| 2,455,819 | 12/1948 | Smith | 242/84.8 |
| 2,893,655 | 7/1959 | Carlson | 242/84.8 |
| 3,078,058 | 2/1963 | Roe | 242/84.8 |

*Primary Examiner*—John W. Huckert
*Assistant Examiner*—John M. Jillions
*Attorney, Agent, or Firm*—Robert E. Burns; Emmanuel J. Labato; Bruce L. Adams

[57] ABSTRACT

A decametre tape measure case comprises an outer shell with a central spindle and a cover disc rotating around this spindle. The disc forms a cover for the outer shell and includes, on its inner side, a rolling drum for the measuring tape and, on its outer side, a handle. The spindle is formed by a fixed collar forming part of the outer shell and having a cylindrical periphery, and by a cylindrical retaining axle extension with a head at its free end and with an out-of-round section at its other end which is inserted into a corresponding opening in the collar. The axle is fixed by a screw traversing an axial aperture of the outer shell and screwed into the axle, the axial play of the rotating cover disc relative to the outer shell being limited by the said head of the axle. This head forms a stop for an annular collar at the internal tape of the drum of the disc.

2 Claims, 3 Drawing Figures

CASE FOR A LINEAR MEASURING DEVICE

The invention relates to a case for a linear measuring device, particularly a decametre tape, and consists of an outer shell containing a central axle or spindle and a cover disc rotating round the spindle, the disc forming a cover for the outer shell, the inside of the disc forming the rolling drum for the tape measure and the outside a handle.

These devices are for measuring lengths of the order of one or several decametres by means of a calibrated tape which will unroll during the measuring operation and is rolled up inside the case when at rest. Such cases of known construction are complicated and consist of numerous parts moulded, machined or assembled at high cost. This is particularly true of assemblies of fixed parts with parts which turn as the tape moves during the actual measuring operations, and particularly for the cantilever spindle type of arrangement.

The object of the present invention is to alleviate these drawbacks by means of a very stable construction, of simple design, at low cost and with easy and reliable operation.

According to the invention there is provided a case for a linear measuring device, particularly a decametre tape, comprising an outer shell with a central axle or spindle and a cover disc rotating around this spindle, the disc forming a cover for the outer shell and including, on its inner side, a rolling drum for the measuring tape and, on its outer side, a handle, said spindle being a fixed collar forming part of the outer shell and having a cylindrical periphery, and by a cylindrical axial axle extension with a head at its free end and with an out-of-round section at its other end which is inserted into a corresponding opening in the collar, the axle extension being fixed by a screw crossing an axial aperture of the outer shell and screwed into the axle extension and the axial play of the rotating cover disc relative to the outer shell being limited by the said head of the axle extension, this head forming a stop for an annular collar on the internal periphery of the drum of the cover disc.

In this way a rotating spindle of great rigidity has been made, although it is formed of two parts, the spindle acting also as an axial stop for the rotating part of the device. By this method of construction a good cantilever spindle length is obtained, permitting perfectly centred rotation of the revolving cover disc and ensuring durability of the parts under friction because of the relatively large contact surface areas.

Also, the parts making up the rotating spindle, the collar and the axle extension are assembled by means of a simple screw with a countersunk head, whose only function is to hold these parts one inside the other in such a way that this screw is never tightened or unscrewed while the cover disc is rotating.

It is noted that known cases incorporate a retractable rocking handle in a groove of the rotating disc, this handle being held in position by a spring, supported by the rotating cover disc.

A further disadvantage of these cases is that the rotating part may be subject to inadvertent and undesired rotation due to the spring couple formed by the rolled-up tape when, for example, this is made of steel. During this inadvertent rotation, the spirals of rolled tape inside the case are set at larger and larger diameters until they become jammed, the outer spiral forming a blockage at the periphery of the fixed outer shell. In this position it is extremely difficult to extract the tape from the box and further, since the spirals are not in contact with the rolling drum, a number of "free" turns of the flanged disc are required before the partially protruding tape can be re-inserted.

This problem is almost impossible to avoid with cases of known construction, or at least one must have recourse to complicated or costly methods, or accept less reliable operation.

Another object of this invention is to solve these problems by a device of simple design which enables the rotating disc to be braked and thus avoids any inadvertent rotation, the device cooperating with the head of the axial axle extension forming part of the rotating spindle or axle.

To this effect, another characteristic of the present invention is that the maintaining spring is a flat convex spring, the convex part is supported by the handle and one of its ends by the axle extension head.

In this manner, the action of maintaining the crank handle in its two positions and braking the rotating part is effected by means of a single spring supported on the axle extension head.

The invention will be clearly understood by the following description and by the attached figures.

Figure 2:
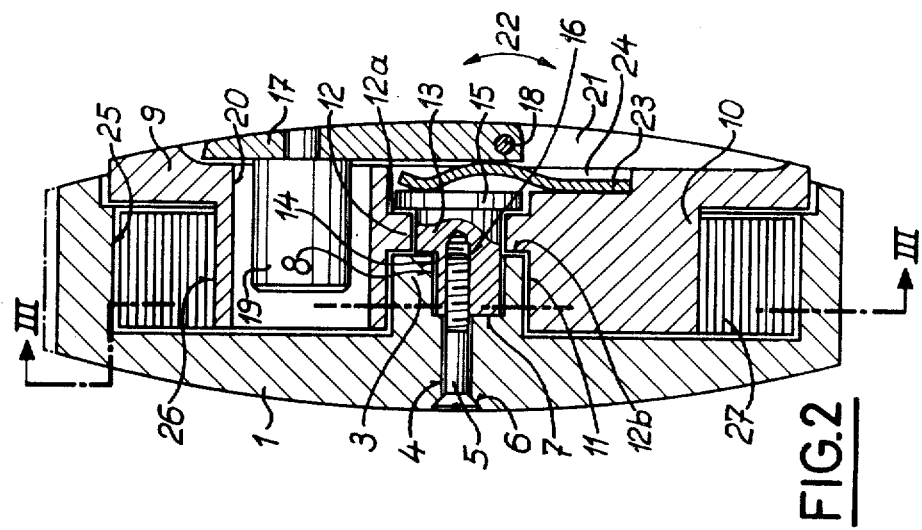
FIG. 2 is a cross section on line II—II of FIG. 1.
Figure 1:
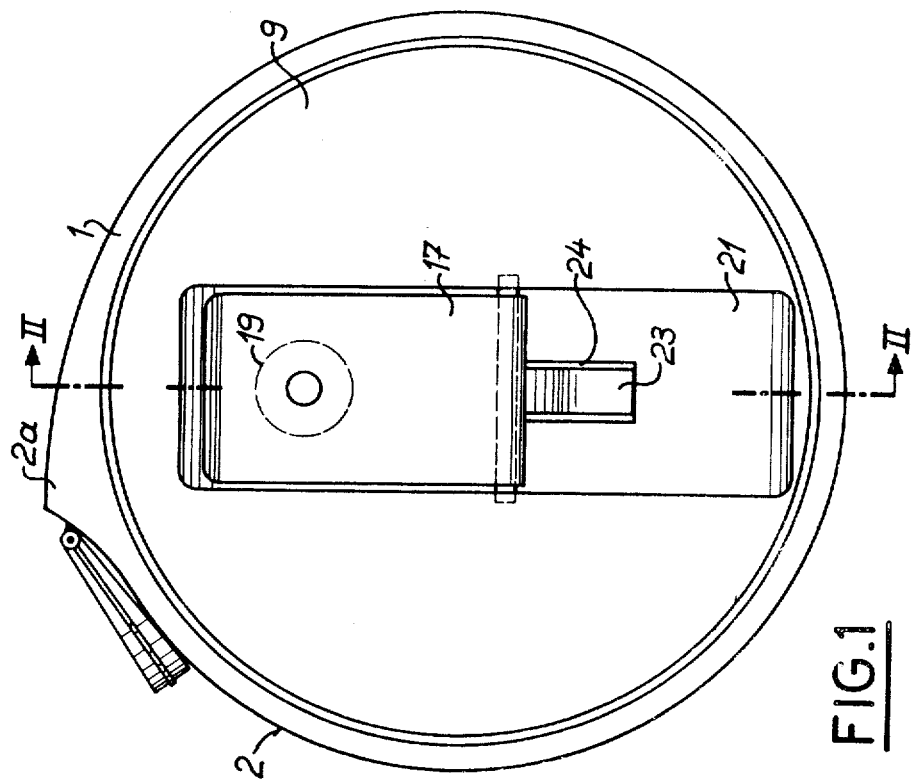
FIG. 1 is a plan view of the case in accordance with the invention.
Figure 3:
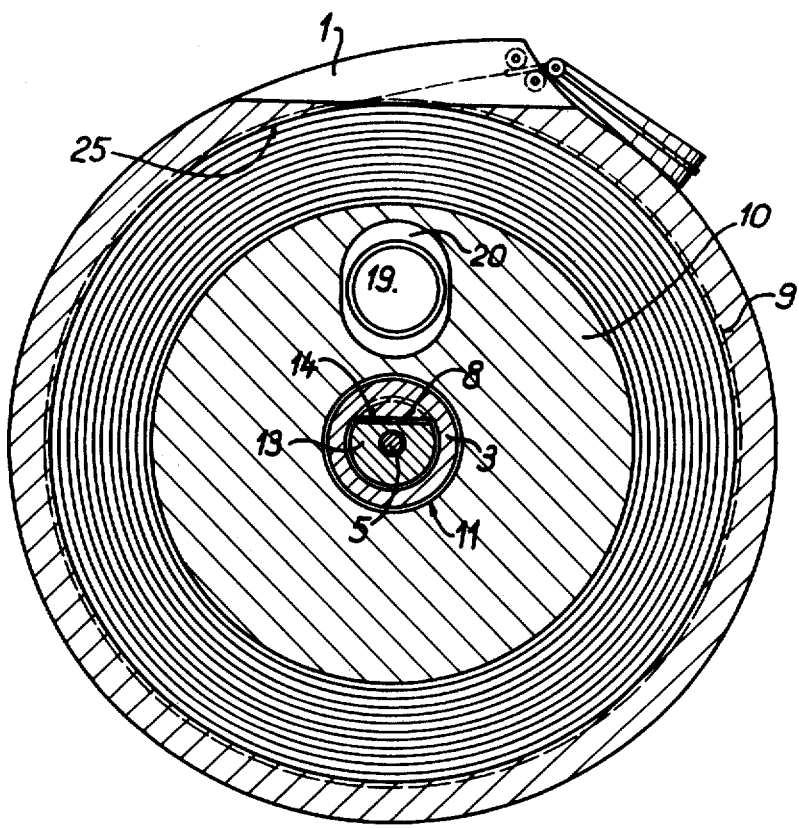
FIG. 3 is a cross section on line III—III of FIG. 2.

A decametre tape case in accordance with the invention is composed of an outer shell 1 forming a single part with a circular peripheral face 2 including a tangential opening 2a for a tape 27 and a central internal flanged collar 3 with a cylindrical circumference. The case also includes a rotating cover disc 9 forming the cover for the outer shell 1 and including at its centre and on its internal face the rolling drum 10 formed by a protuberance of the disc and on the periphery 26 of which the tape is rolled or wound. The drum 10 is provided with a central recess 11 which enables the rotating disc 9 to engage freely with the collar 3 of the outer shell.

The disc 9 rotates around the central spindle or axle consisting firstly of the collar 3 of the outer shell 1 and secondly of the cylindrical retaining axial axle extension 13 with a cylindrical head 15 held onto the outer shell 1 by a simple axial screw 5. The collar 3 has a central bore 7 extended to a hole 4 which opens onto the external face of the outer shell 1 and the axle extension 13 is set in with its end in the bore 7 so that it is locked together with this in rotation. In the example illustrated, the locking together of these two parts in rotation is effected by a flattened area 8 of the bore 7 which is otherwise cylindrical, which cooperates with a flattened area 14 at the end of the axle extension 13. It would be possible to provide other means for locking these two parts in rotation without departing from the principles this invention. The axial screw 5 with countersunk head in the socket 6 of the outer shell 1 is screwed into a tapped hole 16 in the axle extension 13 and freely traverses the central hole 4 of the said outer shell. This screw, whose sole function is to hold together two parts already locked in rotation, axle extension 13 and collar 3, is hence not subject to any tightening or unscrewing when the cover disc 9 rotates on the spindle.

The head 15 of the axle extension 13 permits the axial play of the rotating disc 9 turning around the spindle to be limited to one direction only, by virtue of its retaining the annular collar face 12a of the rotating disc. Limitation of axial play in the other direction is effected by a second annular face 12b of the cover disc which is supported against the front face of the collar 3 which is integral with the outer shell 1. In the example shown in the figure, the two annular radial faces 12a and 12b are formed by an internal annular collar 12 on the internal periphery of the drum out of the cover disc 9. The fact that the spindle, collar 3 and axle extension 13 are assembled in two parts enables the rotating cover disc 9 to be assembled in the outer shell 1 with a certain amount of axial play.

The rotating disc 9 is turned by means of a rocking handle 17 of known design, which is retractable and which fits in a groove 21 of the said disc, the button 19 of the said handle being set into an eccentric groove 20 of the disc, this handle being capable of rocking as shown by the arrow 22 to a passive or an active position. The handle 17 is held in these two positions by means of a flat convex spring 23 whose convex part is supported against the said handle and one end of which is supported by the head 15 of the fixed axle extension 13. This spring is also fitted into a socket 24 provided on the disc 9 and is thus solid with it when rotating.

In this way the friction force between the end of the spring 23 and the head 15 of the axle extension resulting from the dual support of the said spring firstly from the fixed part of the device, the axle extension 13, and secondly from the movable disc 9, enables all inadvertent rotation of the movable part to be avoided.

What we claim is:

1. A case for a tape measure comprising, an outer shell defining a first side of a case for a tape measure and the periphery of said case, said outer case having an axial spindle, a cover disc defining a second side of said case and having a tape drum extending therefrom rotatable about said spindle, said drum having an internal collar, means defining an axial extension of said spindle having a head internally of said tape drum axially spaced from an inner end of said spindle defining an annular groove therewith receiving said collar of said tape drum for rotation therein, fastener means extending through said shell and spindle thereof removably holding said axial extension removably assembled to said spindle, a handle on said disc for rotating said cover disc, said spindle having a non-circular bore, said axial extension having a portion including a non-circular cross section received in said non-circular bore, said cover disc having a recess, a spring in said recess bearing against said handle for retaining it in a retracted position on said cover disc and an extended position when manually actuated to said extended position, said spring being removably received in said recess and frictionally bearing on said head of said axial extension, and said spring comprising a flat spring having a convex portion bearing against said handle and holding said cover disc against undesired rotation.

2. A case for a tape measure according to claim 1, in which said fastener means comprises a threaded screw threaded into said axial extension, the axial portion of said head thereof being determined by the extent said screw is threaded into said axial extension, and said head limiting the axial clearance said annular groove provides for said internal collar of said tape drum.

* * * * *